US011046539B2

(12) United States Patent
Lanigan et al.

(10) Patent No.: US 11,046,539 B2
(45) Date of Patent: Jun. 29, 2021

(54) METHODS AND APPARATUS TO ALIGN COMPONENTS OF ADJUSTABLE SENSORS COMPRISING AT LEAST FIRST AND SECOND ALIGNERS

(71) Applicant: ZEBRA TECHNOLOGIES CORPORATION, Lincolnshire, IL (US)

(72) Inventors: Daniel P. Lanigan, Elgin, IL (US); Karl Torchalski, Arlington Heights, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 139 days.

(21) Appl. No.: 16/532,424

(22) Filed: Aug. 5, 2019

(65) Prior Publication Data
US 2021/0039907 A1 Feb. 11, 2021

(51) Int. Cl.
*B65H 7/20* (2006.01)
*B65H 7/14* (2006.01)
*G01D 5/30* (2006.01)

(52) U.S. Cl.
CPC ............... *B65H 7/14* (2013.01); *G01D 5/30* (2013.01)

(58) Field of Classification Search
CPC .......... B65H 7/20; B65H 7/14; G03G 15/605; B29C 53/265; B29C 53/29; G01D 5/30
USPC ............................................... 250/559.3, 221
See application file for complete search history.

(56) References Cited

U.S. PATENT DOCUMENTS

| 9,690,245 | B2 * | 6/2017 | Harada .............. G03G 15/6541 |
| 2006/0027958 | A1 | 2/2006 | Lapstun et al. |
| 2006/0162456 | A1 | 7/2006 | Kennedy et al. |
| 2010/0072696 | A1 | 3/2010 | Cheng |
| 2015/0136852 | A1 | 5/2015 | Tsirline et al. |
| 2018/0357452 | A1 | 12/2018 | Duckett et al. |

OTHER PUBLICATIONS

International Search Report and Written Opinion for International Application No. PCT/US20/043933 dated Oct. 26, 2020.

* cited by examiner

Primary Examiner — Que Tan Le

(57) ABSTRACT

An apparatus having a first aligner rigidly connected to a first sensor component. The apparatus having a second aligner rigidly connected to a second sensor component. The apparatus having a gap positioned to receive media, wherein the first aligner is configured to attract the second aligner across the gap to align the first sensor component with the second sensor component.

32 Claims, 11 Drawing Sheets

METHODS AND APPARATUS TO ALIGN COMPONENTS OF ADJUSTABLE SENSORS COMPRISING AT LEAST FIRST AND SECOND ALIGNERS

FIELD

Examples disclosed herein are related to sensors and, more particularly, to methods and apparatus to align components of adjustable sensors.

BACKGROUND

Media processing devices use transmissive sensors to sense one or more elements of media (e.g., position indicators such as black marks, notches, or edges of media units) as the media passes through the media processing device from, for example, a media roll to a printhead. When the transmissive sensor senses a position indicator, the media processing device determines the position of the media or a media unit (e.g., label) relative to, for example, the printhead.

DETAILED DESCRIPTION

Figure 1:
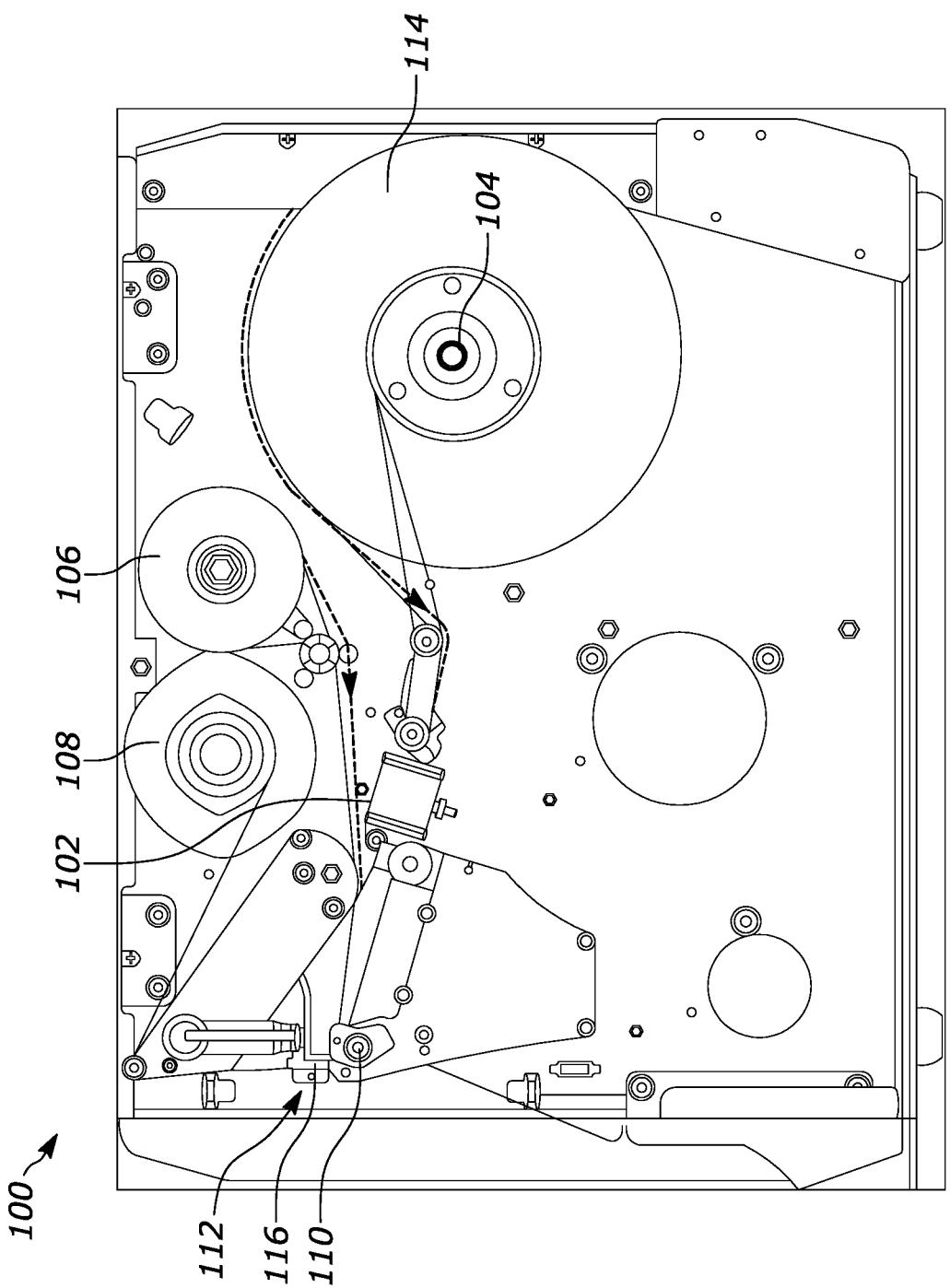
FIG. 1 depicts an example media processing device.

Some media processing devices (e.g., thermal transfer printers, direct thermal printers, radio frequency identification (RFID) tag encoders, etc.) receive and process different types (e.g., sizes) of media. In such devices, one or more sensors are tasked with detecting position indicators on media to enable the media processing device to, for example, detect an edge of a media unit (e.g., a label). In some instances, the sensors are movable along an axis to accommodate differently positioned indicators. For example, media A has indicators in a midpoint of a width of a media feed path (i.e., along a centerline), whereas media B has indicators off center of the media feed path (e.g., at a distance away from the centerline). As such, the sensor(s) tasked with sensing the indicators are moved from, for example, a centerline position when the media processing device is loaded with media A and away from the centerline position when the media processing device is loaded with media B.

When the sensor is moved to accommodate a change in indicator position, component(s) of the sensor may become misaligned. For example, an emitter of the sensor may become misaligned with a counterpart detector of the sensor. Such sensor components need to be properly aligned with each other to ensure that the detector receives a signal generated by the emitter, such that when an indicator passes between the emitter and detector, a change in the receipt of the signal at the detector occurs, thereby triggering an indicator detection. In such instances, maintaining precise alignment between the emitter-detector pair as the sensor is moved is critical.

One known system of keeping the sensor components aligned involves a thumb wheel accessible to a user. As the user rotates the thumb wheel, a first shaft coupled to an emitter rotates to shift the emitter across a width of a media feed path. The first shaft is connected to a gear train that translates rotation from the first shaft into rotation of a second shaft coupled to a detector. The rotation of the second shaft causes the detector to move similarly to the emitter, thereby maintaining alignment between the emitter and the detector. This system involves a complicated assembly of moving parts in frictional contact causing wear and tear, thereby reducing the lifespan and durability of the system. Another complication of the known system is that the assembly is highly complex with many moving, interrelated parts. This complexity affects yield during manufacturing and issues with field repair. The known assembly has an increased cost due to its complicated design. The known assembly contains cables that must translate within the assembly and are subject to binding and fatigue. In adjusting misalignment of the known assembly, full removal, disassembly, and reassembly are required. The known assembly being a fixed, rigid system creates a difficulty for routine maintenance and clearing media jams. The media gap in the known assembly is intentionally small to aid in better media unit tracking, however, because of small media gap, the known assembly cannot be easily disassembled for cleaning. The known assembly requires a skilled or trained operator to correctly re-assemble a sensor subsystem that has been dis-assembled for removing or cleaning jammed media.

Other known systems require a user to align the emitter and the detector manually. Due to precise alignment requirements of the emitter-detector pair, if the user fails to precisely align the emitter and detector, the signal received by the detector is compromised and will not provide accurate data. That is, this known system is vulnerable to user error.

Examples disclosed herein provide contactless alignment of sensor components that, in addition to eliminating adverse effects listed above, eliminates or at least reduces user error when moving a sensor to, for example, different positions in a media feed path. As described in detail below, examples disclosed herein include aligners rigidly connected to sensor components that, via a contactless (e.g., magnetic) attraction to one another, bring the sensor components into alignment with each other when moved. Additionally, examples disclosed herein maintain the achieved alignment without relying on a user to precisely align the sensor components.

FIG. 1 depicts an example of a media processing device 100 including a sensor 102 constructed in accordance with teachings of this disclosure. The example media processing device 100 of FIG. 1 is a printer that generates indicia on media using either direct thermal printing technology or thermal transfer printing technology. However, examples disclosed herein may be implemented in any suitable media processing device that employs one or more print technologies to generate indicia on media and/or encode information onto the media. Further, while examples are described herein in connection with media processing devices, the sensor component alignment methods and apparatus disclosed herein are applicable to any device in which two or more components are required to be aligned.

The example media processing device 100 of FIG. 1 includes the sensor 102, a media spindle 104, a plurality of guide components (e.g., rollers that guide media and/or ribbon), a ribbon supply spindle 106, a ribbon take-up spindle 108, a platen assembly 110, and a print mechanism 112. The media spindle 104 is configured to hold a spool of media 114 that is fed to the print mechanism 112 and out an exit. In the illustrated example, the media processing device 100 can be configured for either direct thermal printing or thermal transfer printing. As such, the media 114 is either direct thermal media or thermal transfer media.

For thermal transfer printing, the ribbon supply spindle 106 is configured to hold a spool of unused ribbon. The ribbon is fed from the ribbon supply spindle 106 to the print mechanism 112, which uses the ribbon to generate indicia on the media 114 that is concurrently fed to the print mechanism 112. The ribbon take-up spindle 108 is configured to hold a spool of used ribbon (e.g., ribbon that has been fed through the print mechanism 112).

For direct thermal printing, the media 114 is fed to the print mechanism 112, which heats the media 114 to generate indicia by causing heat-sensitive dye in the media 114 to change color (e.g., white to black).

The example media processing device 100 of FIG. 1 receives data representative of printing tasks (e.g., print jobs) from internal memory and/or an external data source (e.g., a host device, a host system, a network device, and/or a removable storage device). The media processing device 100 processes the received data such that the data is usable to print indicia on the media 114. For example, a processor of the media processing device 100 utilizes a print engine to generate print data lines (e.g. directly or based on a bit map image) based on the received data and transmits the print data lines (or any other type of data usable to print indicia on media) to a logic circuit of a printhead 116 carried by the print mechanism 112. The printhead 116 is configured to generate indicia on the media 114 in accordance with the received data. For example, the logic circuit of the printhead 116 selectively energizes (e.g., heats) elements (e.g., printhead dots) of the printhead 116 according to the received data (e.g., print lines), thereby generating the corresponding indicia on the media 114 being fed to the printhead 116. In particular, the printhead 116 generates indicia on the media 114 at a nip formed by a roller of the platen assembly 110 and the printhead 116.

Notably, the printhead 116 is carefully positioned to ensure that indicia are generated in the correct location on, for example, a media unit (e.g., a label) of the media 114. As such, the position of one or more aspects of the media unit relative to the printhead 116 is an important data point. To determine this relative position information, the media processing device utilizes the sensor 102.

The example sensor 102 is positioned along a media feed path (i.e., the path that the media 114 travels from the media spindle 104 to the printhead 116. The media processing device 100 utilizes indicators on the media 114 to determine the position of the media 114 and/or a particular media unit (e.g., label) relative to, for example, the printhead 116. The example sensor 102 is tasked with detecting such indicators. A challenge arises when the media processing device 100 is capable of processing different types (e.g., sizes) of media for which the indicators may be positioned at different locations on the media web. In particular, to accommodate the differently positioned indicators, the sensor 102 is movable across the media feed path. As described above, movement of the sensor 102 introduces a risk of misalignment between components of the sensor 102. However, as detailed below, the example sensor 102 achieves and maintains alignment of the components thereof.

Figure 2:
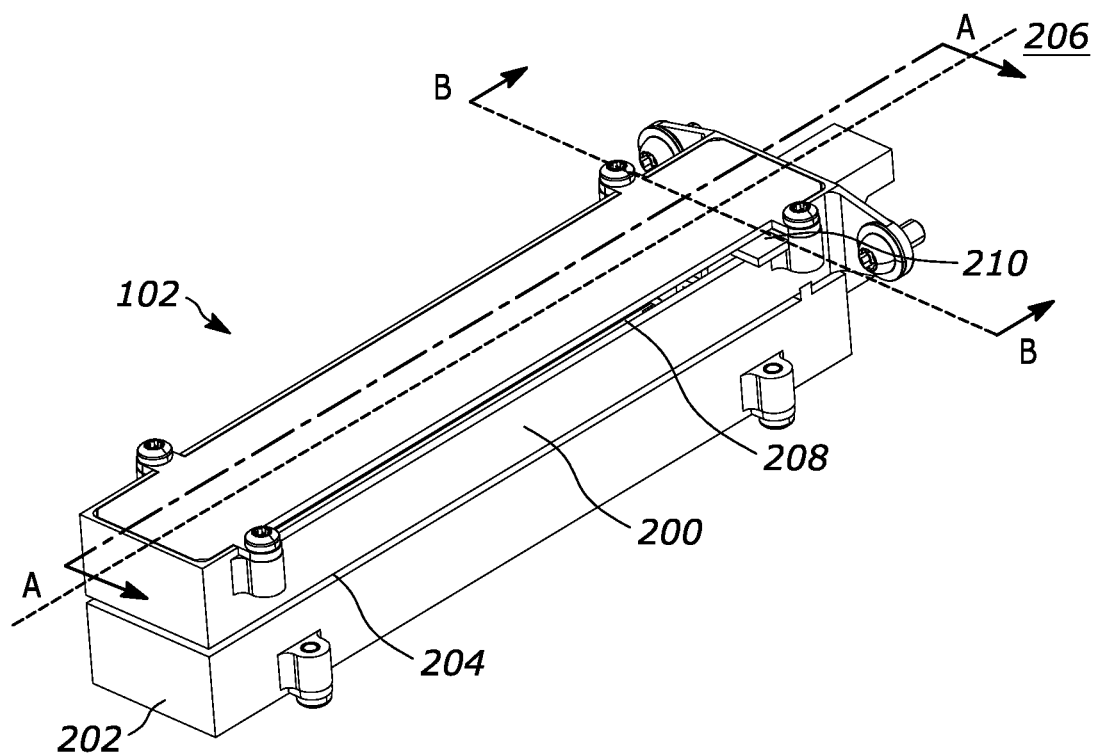
FIG. 2 depicts an example sensor constructed in accordance with teachings of this disclosure.

FIG. 2 depicts an embodiment of the example sensor 102 of FIG. 1 in isolation from other elements of the media processing device 100. The example sensor 102 has a first housing 200 and a second housing 202. In this example, the first housing 200 and the second housing 202 are separated by gap 204 through which the media 114 passes. The example first housing 200 of FIG. 2 contains a first carrier 300 (FIG. 3) configured to travel within the first housing 200 in a direction along a longitudinal axis 206. The example second housing 202 of FIG. 2 contains a second carrier 302 (FIG. 3) configured to travel within the second housing 202 in a direction along the longitudinal axis 206. In the illustrated example, the first carrier 300 has a tab 210 protruding through a slot 208. The tab 210 is configured to provide a user with a gripping surface such that the user can move the first carrier 300 within the first housing 200 by sliding the tab 210 along the longitudinal axis 206. The slot 208 extends the length of the first housing 200 to allow the tab 210 to move the first carrier 300 from one end of the housing 200 to the other.

Figure 3:
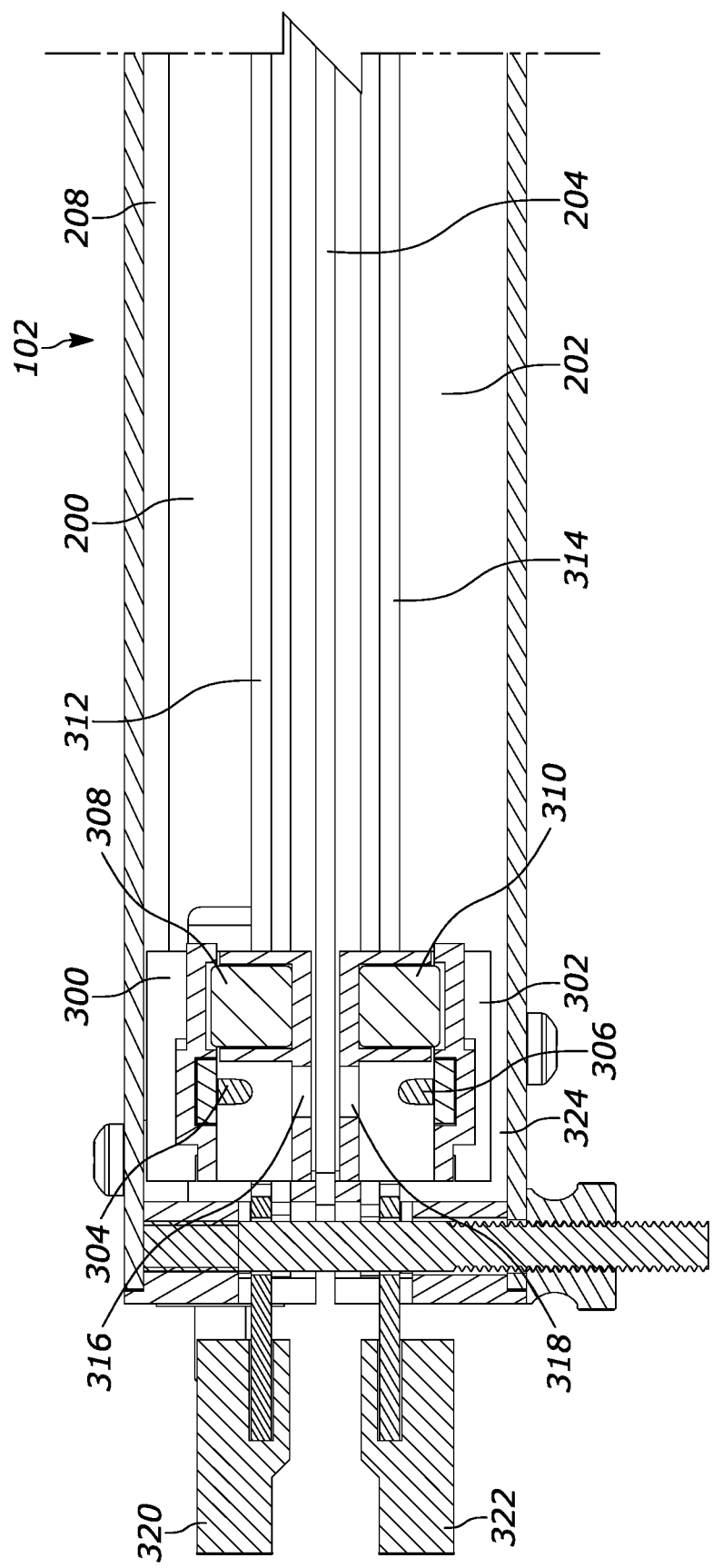
FIG. 3 is a cross sectional view of the example sensor depicted in FIG. 2 along axis A-A.

FIG. 3 is a cross section of the view shown in FIG. 2 along axis A-A. As shown in FIG. 3, the first carrier 300 holds a first sensor component 304 and a first aligner 308. The first carrier 300 supports the first sensor component 304 and the first aligner 308 in a fixed relationship to each other such that the first carrier 300 maintains a distance and an orientation between the first sensor component 304 and the first aligner 308. In the example of FIG. 3, the distance is between a center of the first aligner 308 and a center of the first sensor component 304. However, alternative reference points are possible. In the illustrated example, the first sensor component 304 is an emitted configured to emit a signal (e.g., a light pulse, sound pulse, magnetic pulse, electric pulse). The first sensor component 304 is positioned within the first carrier 300 such that the first sensor component 304 directs the signal through a first aperture 316 in the first carrier 300. In another embodiment, the first sensor component 304 is in the second housing 202 and directs the signal to the second sensor component 306 located in the first housing 200.

Similarly, in the illustrated example, the second carrier 302 holds a second sensor component 306 and a second aligner 310. In the illustrated embodiment, the second carrier 302 supports the second sensor component 306 and the second aligner 310 in a fixed relationship to each other such that the second carrier 302 maintains distance between the second sensor component 306 and the second aligner 310. In the illustrated example, the second sensor component 306 is a detector configured to receive a signal (e.g., a photovoltaic cell, a microphone, a hall sensor). The second sensor component 306 is positioned within the second carrier 302 such that the second sensor component 306 directs the signal through a second aperture 318 in the second carrier 302.

In the illustrated example, when the first aligner 308 is aligned with the second aligner 310 (i.e., the respective centers are along a common axis), the first aperture 316 of the first carrier 300 is aligned with the second aperture 318 of the second carrier 302. In the illustrated example, the aligned first aligner 308 and second aligner 310 allow signals emitted from the first sensor component 304 to be received by the second sensor component 306. Through this process, signals read by the second sensor component 306 can be detected via a processor.

In the illustrated embodiment, the first aligner 308 and the second aligner 310 are magnetically attracted to each other such that the second carrier 302 is held aloft within the second housing 202 such that a second gap 324 exists between the second carrier 302 and a surface of the second housing 202. The second gap 324 will be discussed in detail below.

In some examples, the first carrier 300 has a LED (not shown) that indicates the position of the first sensor component 304 within the first housing 200. The LED provides a light mark that can be seen within the gap 204, which enables the user to see where the first sensor component 304 is located. This is helpful for the user when the user is moving the first sensor component 304 via the tab 210.

In the illustrated embodiment, the first sensor component 304 moves in conjunction with (e.g., simultaneously and in the same direction as) the first aligner 304 within the first housing 200. In the illustrated example, the first aligner 304 is a magnet having a first polarity.

In the illustrated embodiment, a magnet having a second polarity opposite the first polarity of the first aligner 304. In the illustrated embodiment, the first polarity of the first aligner 304 is attracted to the second polarity of the second aligner 306.

In the illustrated embodiment, the first housing 200 has a first printed circuit board (PCB) 312. The first PCB 312 provides power and data communication to the first sensor component 304. In the illustrated embodiment, the second housing 202 has a second PCB 314. The second PCB 314 provides power and data communication to the second sensor component 306. In the illustrated embodiment, as will be described in further detail below, both the first PCB 312 and the second PCB 314 are in communication with the processor via a respective first electrical connector 320 and a second electrical connector 322, respectively.

In the illustrated embodiment, the first sensor component 304 and the second sensor component 306 may be photovoltaic sensors, hall sensors, LED sensors, proximity sensors, light-based sensors, or any other type of equivalent sensor.

Figure 4:
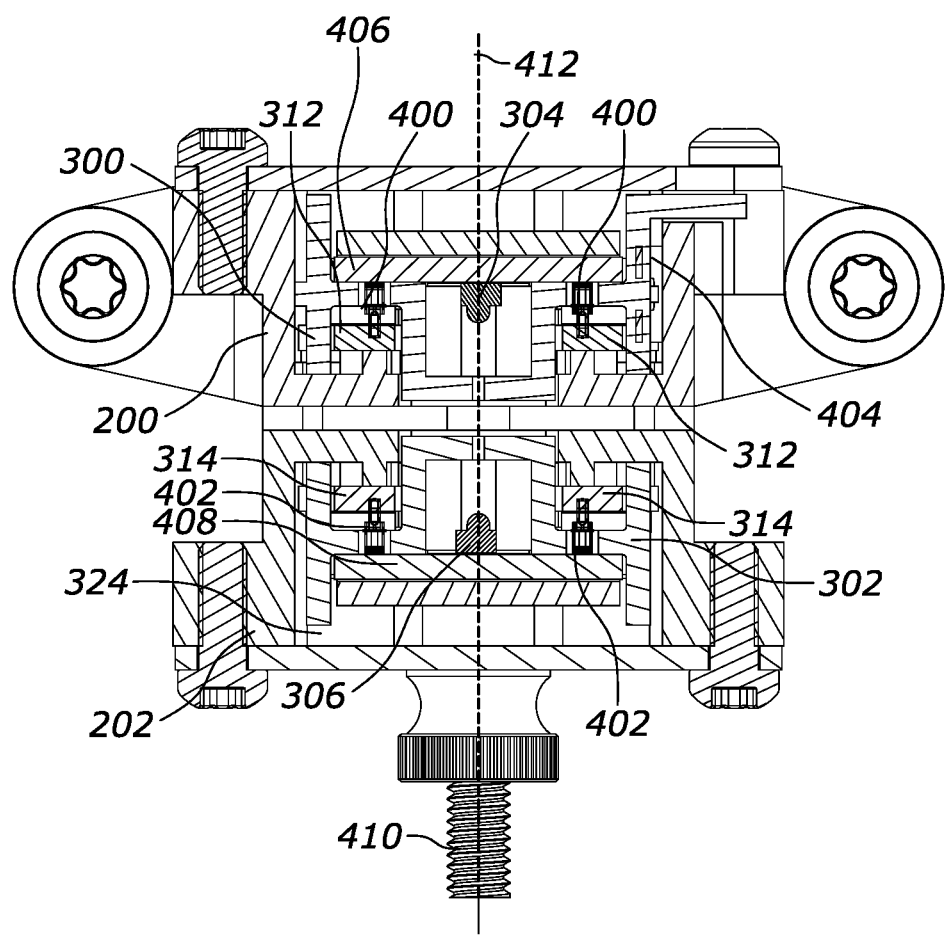
FIG. 4 is a cross sectional view of the example sensor of FIG. 2 along axis B-B.

FIG. 4 shows a cross sectional view of the first sensor 102. In the illustrated embodiment, the first carrier 300 has a biasing device 404 positioned between the first carrier 300 and an inner wall of the first housing 200. In the illustrated embodiment, the biasing device 404 is a leaf spring. The biasing device 404 can be any device capable of providing a force to between the first carrier 300 and the inner wall of the first housing 200. The example biasing device 404 of FIG. 4 provides a force against the first carrier 300 such that the first carrier 300 is pressed into a housing wall opposite the inner wall such that frictional forces are created to keep the first carrier 300 in one position throughout normal media processing operations. In the illustrated embodiment, the biasing device 404 acts against the first carrier 300 to hold the first carrier 300 in place during normal activity of the media processing unit 100. The media processing unit 100 may gently vibrate or the sensor 102 may vibrate due to the media passing by which can cause the first carrier 300 to come unaligned over time. The biasing device 404 maintains alignment. However, a user can still overcome the force applied by the biasing device 404 to move the first carrier 300 to a different position when necessary. That is, the force applied by the biasing device 404 is great enough to prevent undesirable movement due to, for example, vibrations, but not strong enough to prevent a user from moving the first carrier 300 using the tab 210.

In the illustrated embodiment, the first PCB 312 and the second PCB 314 are designed with a space in the middle that allows the first carrier 300 to extend through the space in the first PCB 312 and for the second carrier 302 to extend through the space in the second PCB 314. In the illustrated embodiment, the first carrier 300 has a first carrier PCB 406 secured within the first carrier 300 in communication with the first sensor component 304. In the illustrated embodiment, the second carrier 302 has a second carrier PCB 408 secured within the second carrier 302 in communication with the second sensor component 306. The carrier PCBs 406 and 408 are connected to their associated components within the same carrier 300 and 302, respectively. The first PCB 406 is connected to the first sensor component 304 and the first contacts 400. The second PCB 408 is connected to the second sensor component 306 and the second contacts 402. In the illustrated embodiment, a pivoting screw 410 is shown extending through the first housing 200 and the second housing 202. The pivoting screw 410 will be explained in further detail below.

In the illustrated embodiment, the first carrier PCB 406 is in communication with the first PCB 312 via first contacts 400. In the illustrated embodiment, the second carrier PCB 408 is in communication with the second PCB 314 via second contacts 402. In the illustrated embodiment, the first contacts 400 and the second contacts 402 are electrical contacts that enable communication between the first carrier PCB 406 and the first PCB 312, and between the second carrier PCB 408 with the second PCB 314, respectively. In the illustrated embodiment, the first carrier 300 is supported by the first PCB 312 such that when the first carrier 300 moves within the first housing 200, the first contacts 400 maintain a connectivity to the first PCB 312.

In the illustrated embodiment, the second carrier 302 is supported via the attraction between the first aligner 308 and the second aligner 310 such that when the second carrier 302 is in a supported position, the second gap 324 exists between the second carrier 302 and the second housing 202. In the illustrated embodiment, a supported position is achieved when the first aligner 308 and the second aligner 310 are aligned and the attraction between the aligners 308 and 310 causes the second carrier 302 to be held aloft. When the second carrier 302 is in the supported position, the second contacts 402 are in contact with the second PCB 314.

When the first aligner 308 and the second aligner 310 become unaligned, the second aligner 310 loses the attraction to the first aligner 308 and can no longer hold the second carrier 302 aloft within the second housing 202. When this happens, the second carrier 302 is unsupported and falls within the second housing 202 the distance of the second gap 324 to rest on the surface of the second carrier 302. When the second carrier 302 falls within the second housing 202, the second carrier 302 falls away from the first carrier 300 along a center axis 412. The second carrier 302 falling the distance of the second gap 324 causes the second contacts 402 to lose connection to the second PCB 314. When the second contacts 402 lose connection to the second PCB 314, the second sensor component 306 no longer communicates with the processor. The processor then recognizes that the second sensor component 306 is no longer in communication and the processor may generate an alert. The generated alert may be a sound, a text alert, an alarm, a noise, a light, or a notice on a user interface.

Figure 5:
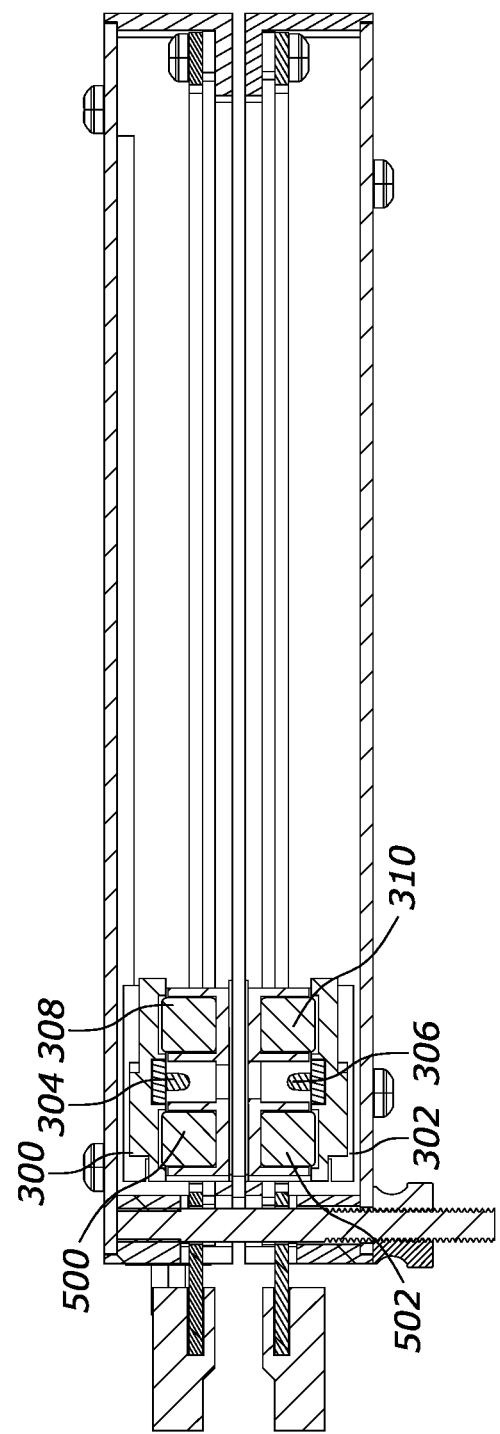
FIG. 5 is a cross sectional view of the example sensor of FIG. 2 along axis A-A

FIG. 5 depicts another embodiment where the first carrier 300 contains a third aligner 500 and the second carrier 302 contains a fourth aligner 502. In the illustrated embodiment of FIG. 5, the third aligner 500 is fixedly positioned adjacent to the first sensor component 304 such that the first sensor component 304 is between the first aligner 308 and the third aligner 500. In the illustrated embodiment of FIG. 5, the fourth aligner 502 is fixedly positioned adjacent to the second sensor component 306 such that the second sensor component 306 is between the second aligner 310 and the fourth aligner 502. In the illustrated embodiment, the third aligner 500 has a third polarity and the fourth aligner 502 has a fourth polarity where the third polarity and the fourth polarity are different and therefore attract each other. In the illustrated embodiment, the third polarity and the second polarity are the same and the first polarity and the fourth polarity are the same. In the illustrated embodiment, the different polarities cause the unaligned aligners (e.g. the first aligner 308/fourth aligner 502 and the second aligner 310/third aligner 500) to repel each other. In the illustrated embodiment, the aligner arrangement maintains an alignment of the first sensor component 304 and the second sensor component 306 as the first carrier 300 is moved and the second carrier 302 moves correspondingly. Similar to the example of FIG. 4, misalignment of the sensor components 304 and 306 causes the second carrier 302 to no longer be pulled toward the first carrier 300 causing the second carrier to drop and lose the connection between the PCBs.

Figure 6:
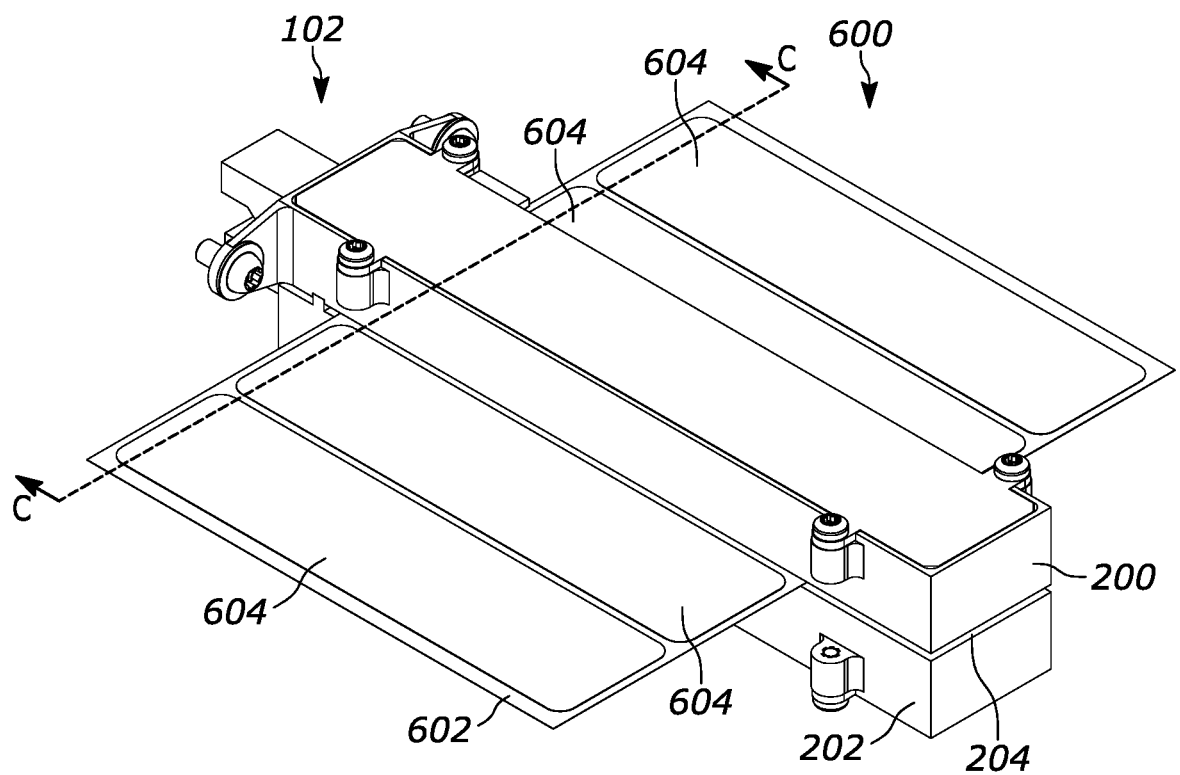
FIG. 6 depicts a media web positioned in the example sensor of FIG. 2.

FIG. 6 depicts the sensor 102 with media 600 passing through the gap 204. The media 600 follows the media feed path through the sensor 102 during operation of the media processing device 100. In the illustrated embodiment, the media 600 comprises a media web 602 on which media units 604 are arranged. In the illustrated embodiment, the media units 604 have an indicator (not shown) which is detectable by the sensor 102. The indicator will be discussed in greater detail below. In the illustrated embodiment, as the media units 604 pass through the gap 204, the indicator on each media unit 604 (or elsewhere on the web 602) is sensed by the passing of signal between the first sensor component 304 and the second sensor component 306. In the illustrated embodiment, the media units 604 are labels on a media web 602, however in other embodiments the media units 604 may be any medium capable of being processed within a media processing device including but not limited to cards, thermal transfer labels, direct thermal labels, laminated labels, or liner-less labels.

Figure 7:
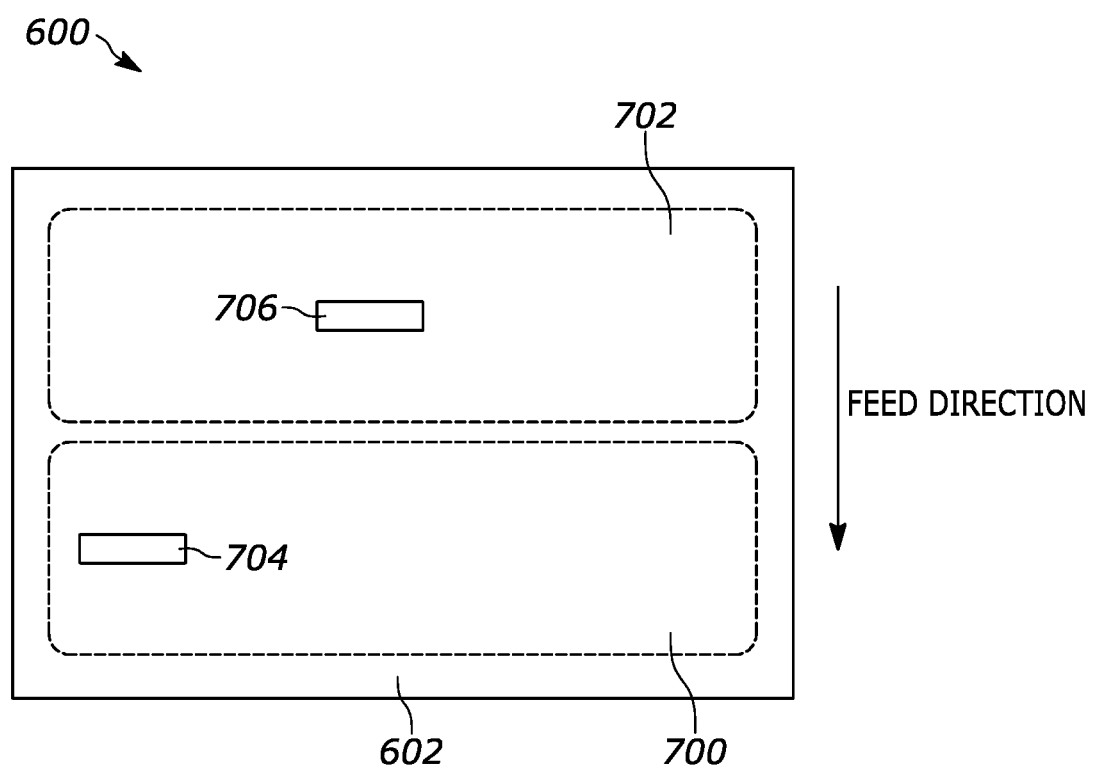
FIG. 7 depicts example position indicators on the example media web of FIG. 6.

FIG. 7 depicts an under side of the media 600 as shown in FIG. 6. In the illustrated embodiment, the media web 602 has a first media unit 700 and a second media unit 702. The first media unit 700 has a first indicator 704. And the second media unit 702 has a second indicator 706. In the illustrated embodiment, the first indicator 704 and the second indicator 706 are black marks. In other embodiments, the first indicator 704 and the second indicator 706 may be a mark, a gap in the media, an object embedded in the media unit, a leading edge of the media unit, a trailing edge of the media unit, or anything that could indicate the position of the media unit with relation to, for example, the printhead 116. In the illustrated embodiment, the first indicator 704 and the second indicator 706 are not positioned at the same point along a width of the media web 602, where the width of the media web is the dimension that is perpendicular to the feed direction and parallel to the printhead 116. If the sensor 102 was set up to detect indicators that are positioned similarly to the first indicator 704, then the sensor would fail to detect the second indicator 706 as the second indicator 706 is not positioned the same as the first indicator 704. The sensor 102 would have to be realigned to detect the second indicator 706.

Referring to FIG. 2, the user would reposition the first carrier 300 (and, thus, the sensor component thereof) via the use of the tab 210. As the first carrier 300 moved, the first sensor component 304 and the first aligner 308 would move correspondingly with the first carrier 300. As the first aligner 308 moved, the second aligner 310 would move correspondingly because of the magnetic attraction between the first aligner 308 and the second aligner 310. Therefore, as the first carrier 300 slides along the axis 206 within the first housing 200, the second carrier 302 would slide correspondingly within the second housing 202. In the illustrated embodiment, as the first aligner 308 moved with the second aligner 310, the first sensor component 304 and the second sensor component 306 would also move correspondingly with each other due to their fixed spatial relationships with the corresponding aligners. In the illustrated embodiment, the first carrier 300 would be moved until the first sensor component 304 aligned with the second indicator 706. This would allow the sensor 102 to adapt to the change of position of the indicator on the media and to continue to function as needed.

Figure 8:
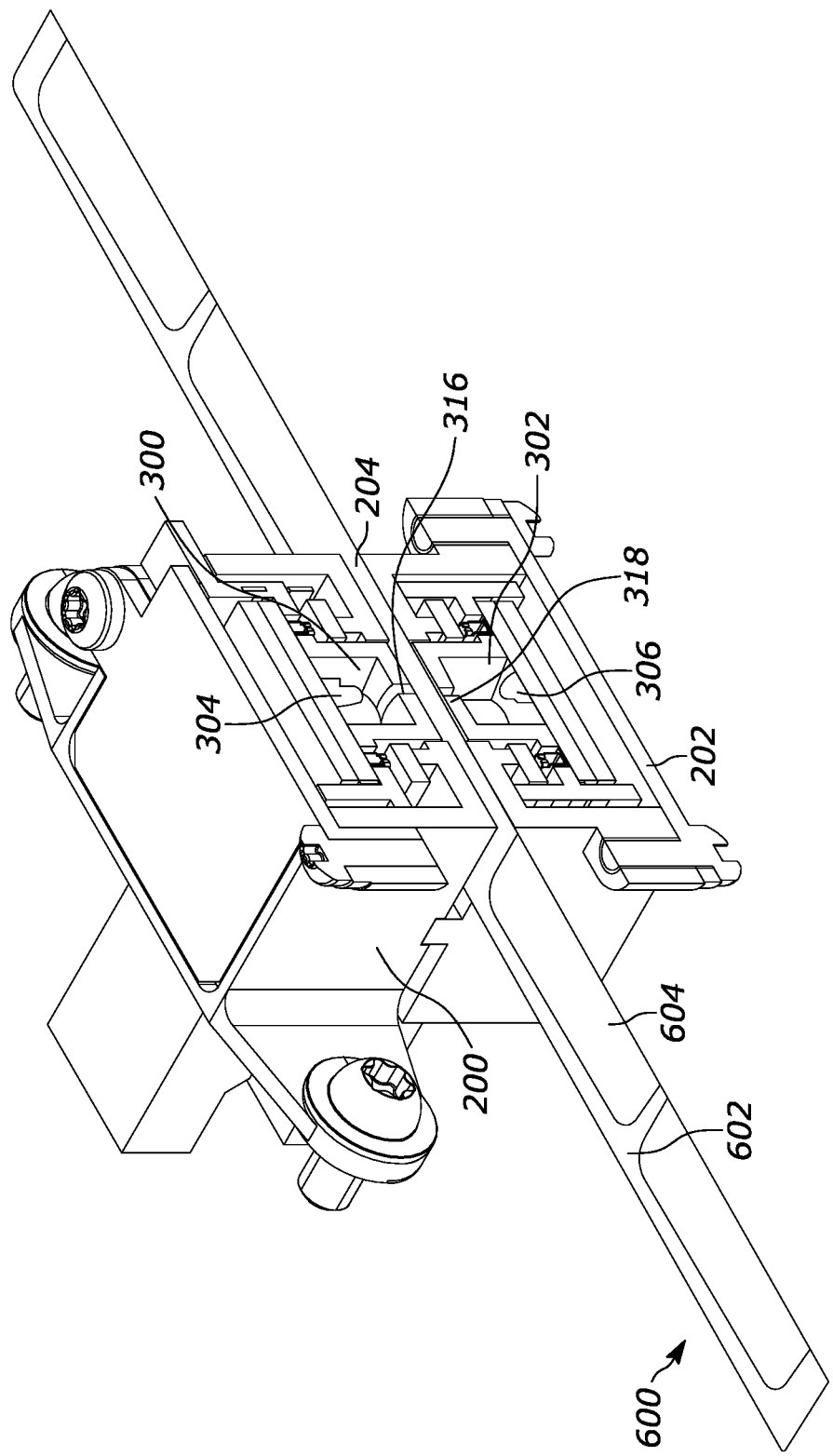
FIG. 8 is a cross sectional view of the example media web of FIG. 6 along axis C-C.

FIG. 8 is a cross section of FIG. 6 along the line C-C. In the illustrated embodiment, the first sensor component 304 emits signal through the first aperture 316, through the media 600, through the second aperture 318, and then received by the second sensor component 306. In the illustrated embodiment, the first aperture 316 and the second aperture 318 act to prevent ambient light from interfering with the second sensor component 306. In other embodiments, the first aperture 316 and the second aperture 318 can be various sizes based on electrical functionality required by the system. In the illustrated embodiment, the second sensor component 306 senses a percentage of the light signal emitted by the first sensor component 304 and the amount of light sensed is relevant to detecting indicators. In the illustrated embodiment, if there was ambient light reaching the second sensor component 306, then the reading would be inaccurate. In the illustrated embodiment, if the first aligner 308 and the second aligner 310 were to become unaligned, this would cause the first sensor component 304 and the second sensor component 306 to become unaligned and prevent the detecting indicators.

Figure 9:
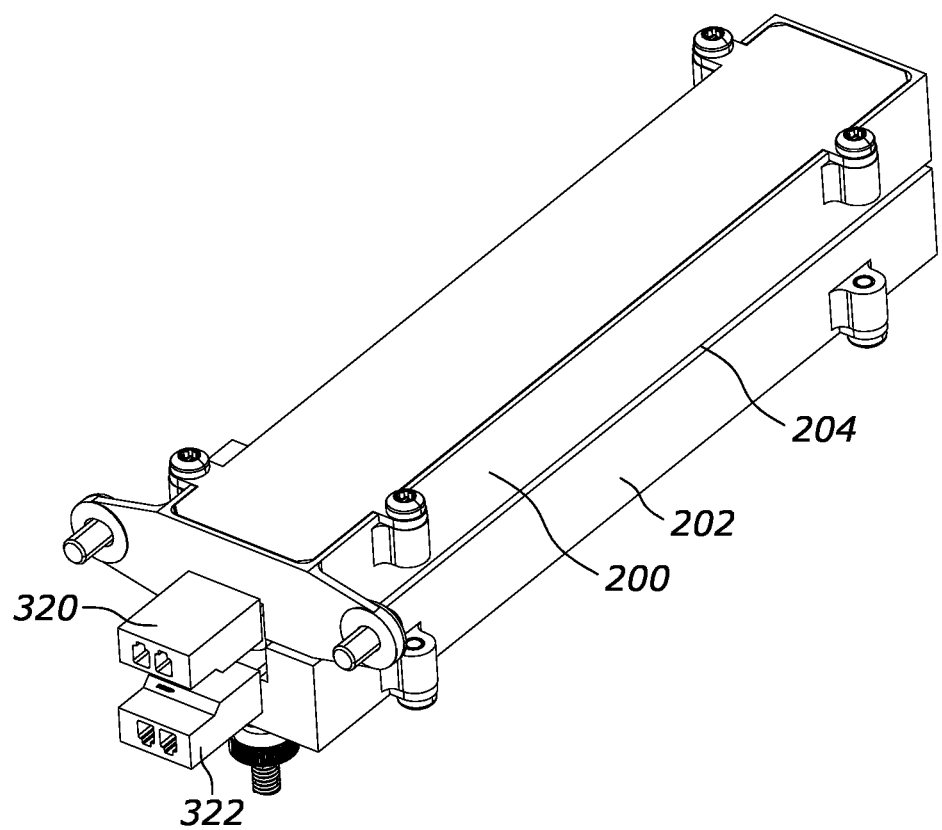
FIG. 9 depicts example electrical connectors connected to the example sensor of FIG. 2.

FIG. 9 depicts an example of the sensor 102 showing the first electrical connector 320 and the second electrical connector 322. In this example, the first electrical connector 320 and the second electrical connector 322 are arranged behind a physical firewall (not shown) and positioned to allow the first PCB 312 and the second PCB 314 to be plugged into the first electrical connector 320 and the second electrical connector 322, respectively. In the illustrated embodiment, the first PCB 312 and the second PCB 314 connect to the processor of the media processing device 100 via the connection to the first electrical connector 320 and the second electrical connector 322, respectively. In this example, the first electrical connector 320 and the second electrical connector 322 allow for the sensor 102 to be plugged into the electrical connectors and removed from the connectors without undue difficulty. In this example, the sensor 102 is modular as it can be easily removed and installed as a separate part to the media processing device 100, which helps in cleaning the sensor 102.

How to Recouple when the Aligners Become Unaligned

In the illustrated embodiment in FIG. 3, when the first aligner 308 and the second aligner 310 are unaligned, the second carrier 302 will fall into the gap 324 as described above, which is sensed by the processor via the loss of connection between the second contacts 402 and the second PCB 314. In response, the user must realign the sensor components. In the illustrated embodiment, when the first carrier 300 and the second carrier 302 are misaligned, the user moves the first carrier 300 within the first housing 200 towards the second carrier 302. As the first aligner 308 approaches the second aligner 310, the polarity difference between the first aligner 308 and the second aligner 310 causes the second aligner 310 to be attracted to the first aligner 308. As the second aligner 310 approaches the first aligner 308, the second aligner 310 is attracted to the first aligner 308 and the second carrier 302 is lifted within the second housing 202 and back into contact with the second PCB 314, as described above.

This process is different for the embodiment shown in FIG. 5. In the illustrated embodiment of FIG. 5, the first aligner 308 and the second aligner 310 are aligned, and the third aligner 500 and the fourth aligner 502 are also aligned. In the embodiment of FIG. 5, when the first carrier 300 and the second carrier 302 are unaligned and the second carrier 302 drops within the second housing 202 as described above, the process to realign the carriers is slightly different than the example of FIG. 3. In the embodiment of FIG. 5, when the user moves the first aligner 308 towards the second aligner 310, the first aligner 308 may first come near the fourth aligner 502, and as stated above, the first aligner 308 and the fourth aligner 502 have the same polarity. This causes the first aligner 308 to repel the fourth aligner 502 which would result in the second carrier 302 to move away from the first carrier 300 as the user moves the first carrier 300 towards the second carrier 302. As such, the user continues to "push" the second carrier 302 with the first carrier 300 until the second carrier 302 comes into contact with a side wall of the second housing 202. In the illustrated embodiment, once the second carrier 302 is against the wall and unable to move, the user will be able to overcome the repelling of the first aligner 308 by the fourth aligner 502 and force the first aligner 308 back into alignment with the second aligner 310. In the illustrated embodiment, once the first aligner 308 and the second aligner 310 are realigned, the attraction between the aligners will cause the realignment of the first sensor component 304 with the second sensor component 306.

Accessibility when Cleaning

Some transmissive sensors experience a residue build-up within the gap over time. This residue may be glue, laminate, or any other substance that can be rubbed off from media. An example embodiment of FIG. 10 addresses this issue.

Figure 10:
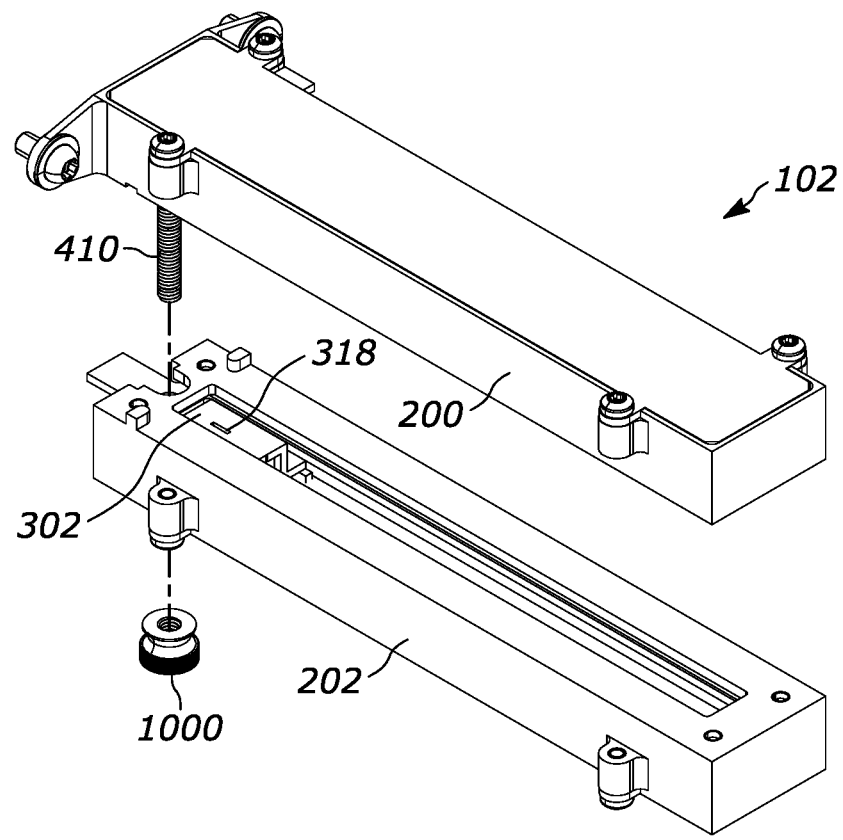
FIG. 10 depicts the example sensor of FIG. 2 with a first housing separated from a second housing.

FIG. 10 depicts an example sensor 102 where the first housing 200 and the second housing 202 are shown separated to show the pivoting screw 410 and a pivoting nut 1000. The pivoting screw 410 and the pivoting nut 1000 can be any type of connecting means which can be connected and unconnected. In the illustrated embodiment, the pivoting screw 410 extends from the first housing 200 towards the second housing 202. The example embodiment allows the sensor 102 to be easily assembled by passing the pivoting screw 410 through an opening in the second housing 202 and securing the sensor 102 together with the pivoting nut 1000. When the first housing 200 and the second housing 202 as depicted in embodiment of FIG. 10 are separated, the residue build-up can be accessed and removed. Built-up residue between the first housing 200 and the second housing 202 may deter operation of the media processing device 100 by preventing media from passing through the example sensor 102 cleanly.

Figure 11:
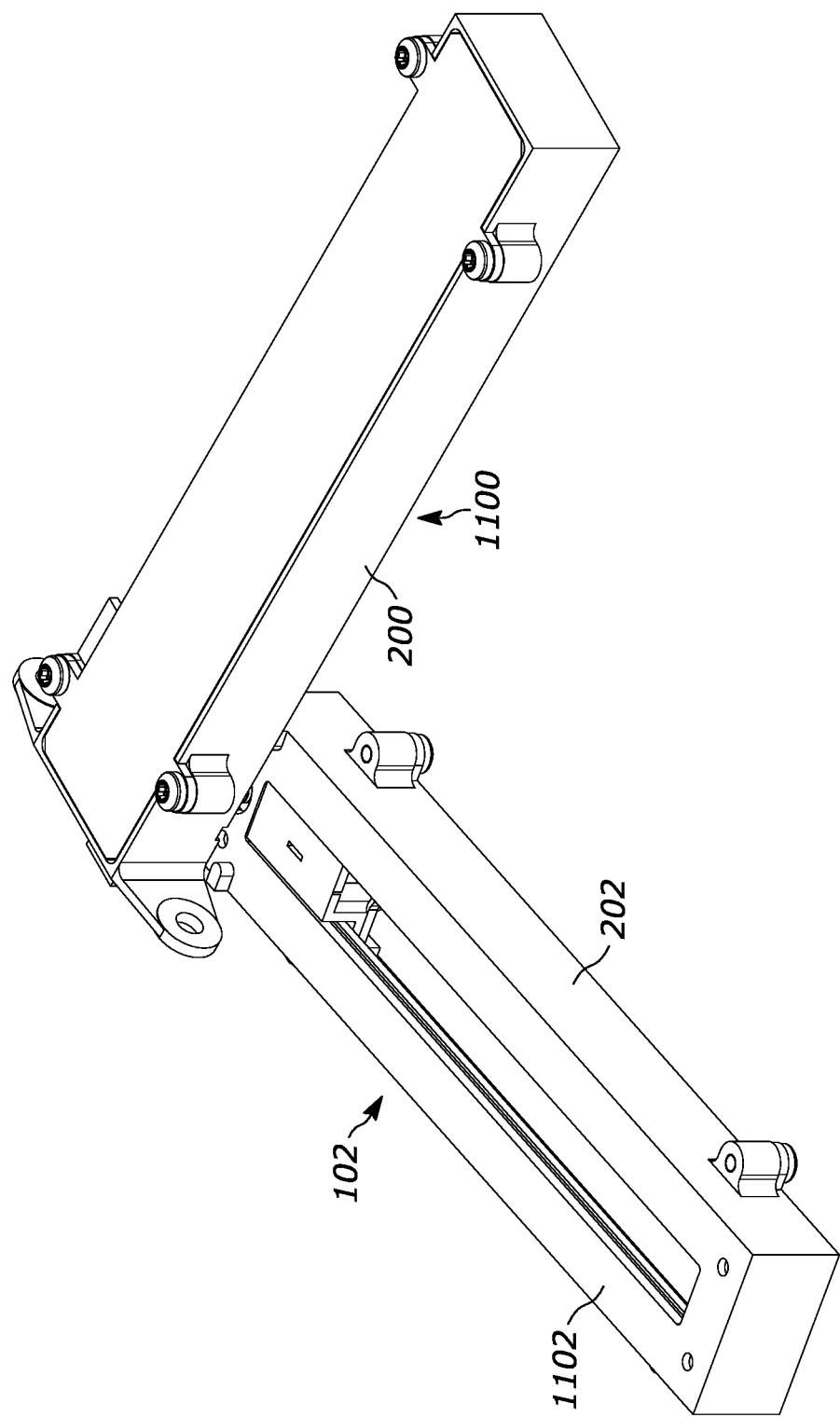
FIG. 11 depicts the example sensor of FIG. 2 with the first housing pivoted away from the second housing.

FIG. 11 depicts the first housing 200 and the second housing 202 pivoting relative to each other. In the illustrated embodiment, the pivoting of the first housing 200 and the second housing 202 exposes a first face 1100 of the first housing 200 and a second face 1102 of the second housing 202 that are on either side of the gap 204. In the example embodiment, the faces 1100 and 1102 of the first housing 200 and the second housing 202 are able to be cleaned.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents and shall not be restricted or limited by the foregoing detailed description.

The invention claimed is:

1. An apparatus comprising:
   a first aligner rigidly spaced from a first sensor component;
   a second aligner rigidly spaced from a second sensor component; and
   a gap positioned to receive media, wherein the first aligner is configured to attract the second aligner across the gap to align the first sensor component with the second sensor component.

2. The apparatus of claim 1, wherein the first sensor component is fixedly coupled to the first aligner, and the second sensor component is fixedly coupled to the second aligner.

3. The apparatus of claim 1, further comprising:
   a first carrier configured to maintain a first spatial relationship between the first aligner and the first sensor component; and
   a second carrier configured to maintain a second spatial relationship between the second aligner and the second sensor component.

4. The apparatus of claim 3, wherein the first carrier includes a third aligner fixedly coupled to the first sensor component, and the second aligner assembly includes a fourth aligner fixedly coupled to the second sensor component.

5. The apparatus of claim 1, further comprising a third aligner fixedly spaced from the first sensor component, and a fourth aligner fixedly spaced from the second sensor component.

6. The apparatus of claim 5, wherein the first sensor component is located between the first aligner and the third aligner.

7. The apparatus of claim 5, wherein the second sensor component is located between the second aligner and the fourth aligner.

8. The apparatus of claim 1, further comprising a first housing configured to carry the first carrier.

9. The apparatus of claim 1, wherein the first sensor component is an emitter, and the second sensor component is a detector.

10. The apparatus of claim 1, wherein the first sensor component is to align with the second sensor component when the first aligner is aligned with the second aligner.

11. The apparatus of claim 3, further comprising a biasing element coupled with the first carrier.

12. The apparatus of claim 1, wherein the second aligner is configured to move away from the gap when the first aligner and the second aligner are unaligned.

13. The apparatus of claim 1, further comprising a tab protruding from the first carrier, wherein the tab is configured to control movement of the first carrier.

14. The apparatus of claim 1, the media having a marking detectable by the first sensor component and the second sensor component.

15. The apparatus of claim 3, further comprising a first circuit board in direct contact with the first carrier, wherein when the first carrier translates along the gap, the first carrier remains in contact with the first circuit board.

16. The apparatus of claim 15, wherein the first circuit board provides an electrical connection to the first carrier.

17. The apparatus of claim 15, further comprising a second circuit board in direct contact with the second carrier, wherein when the second carrier translates along the gap, the second carrier remains in contact with the second printed circuit board.

18. A media sensor comprising:
a first magnet carried by a first housing, the first magnet rigidly coupled to an emitter; and
a second magnet carried by a second housing, the second magnet rigidly coupled to a detector configured to detect a signal generated by the emitter, wherein:
the first housing is positioned on a first side of a gap and the second housing is positioned on a second side of the gap opposite the first side; and
the second magnet is magnetically influenced by the first magnet when the first magnet is moved within the first housing such that the second magnet moves correspondingly within the second housing.

19. The media sensor of claim 18, wherein the gap is configured to receive media.

20. The media sensor of claim 18, further comprising a light emitting diode representative of the location of the emitter within the first housing.

21. The media sensor of claim 18, wherein the first magnet is movable within the first housing to enable alignment of the emitter with a mark located on media passing through the gap.

22. The media sensor of claim 18, further comprising a first circuit board extending along a first length of the first housing, wherein the first emitter remains in contact with the first circuit board as the first magnet translates the length of the first housing.

23. The media sensor of claim 22, wherein the first circuit board is in electrical connection with the emitter.

24. The media sensor of claim 22, further comprising a second circuit board extending along a second length of the second housing, wherein the detector remains in communication with the second circuit board as the second magnet translates the length of the second housing.

25. A media processing device comprising:
a media processing unit configured to process media according to indicators on the media; and
an indicator sensor including:
a first sensor component positioned on a first side of a media feed path along which the media travels;
a second sensor component positioned on a second side of the media feed path, wherein the first and second sensor components cooperate to detect the indicators; and
magnets configured to align the first sensor component with the second sensor component.

26. The media processing device of claim 25, wherein the media processing unit is a printer.

27. The media processing device of claim 25, wherein the media processing unit is an encoder.

28. The media processing device of claim 25, wherein the indicators are marks on the media.

29. The media processing device of claim 25, wherein the indicators are spaces between media units on the media.

30. The media processing device of claim 25, wherein the first sensor component is fixedly coupled to a first one of the magnets, and the second sensor component is fixedly coupled to a second one of the magnets.

31. The media processing device of claim 25, wherein a first one of the magnets has an opposite polarity as a second one of the magnets.

32. The media processing device of claim 25, wherein:
the first sensor component is positioned between first and third ones of the magnets; and
the second sensor component is positioned between second and fourth ones of the magnets.

* * * * *